US012649629B2

(12) United States Patent 
Ai et al.

(10) Patent No.: US 12,649,629 B2 
(45) Date of Patent: Jun. 9, 2026

(54) ROBOT DISPATCHING METHOD AND APPARATUS

(71) Applicant: SHENZHEN KUBO SOFTWARE CO., LTD, Shenzhen (CN)

(72) Inventors: Xin Ai, Shenzhen (CN); Runfang Yu, Shenzhen (CN)

(73) Assignee: SHENZHEN KUBO SOFTWARE CO., LTD, Shenzhen (CN)

( * ) Notice: Subject to any disclaimer, the term of this patent is extended or adjusted under 35 U.S.C. 154(b) by 368 days.

(21) Appl. No.: 18/490,895

(22) Filed: Oct. 20, 2023

(65) Prior Publication Data

US 2024/0043216 A1 Feb. 8, 2024

Related U.S. Application Data

(63) Continuation of application No. PCT/CN2022/086410, filed on Apr. 12, 2022.

(30) Foreign Application Priority Data

Apr. 23, 2021 (CN) .......................... 202110444458.6

(51) Int. Cl.
*B65G 1/137* (2006.01)
*G05D 1/00* (2024.01)
(Continued)

(52) U.S. Cl.
CPC ......... *B65G 1/1378* (2013.01); *B65G 1/1373* (2013.01); *G05D 1/0297* (2013.01);
(Continued)

(58) Field of Classification Search
CPC ...... B65G 1/1378; B65G 1/1373; B65G 1/04; G05D 1/0297; G05D 1/667; G05D 1/6987;
(Continued)

(56) References Cited

U.S. PATENT DOCUMENTS 9,751,693 B1 9/2017 Battles et al.
10,678,228 B2 * 6/2020 Voorhies ................. B66F 9/063
(Continued)

FOREIGN PATENT DOCUMENTS

CN 105858045 A 8/2016
CN 205837747 U 12/2016
(Continued)

OTHER PUBLICATIONS

International Search Report for PCT/CN2022/086410.
(Continued)

*Primary Examiner* — Sohana Tanju Khayer
(74) *Attorney, Agent, or Firm* — Ladas & Parry, LLP

(57) ABSTRACT
This application provides a robot dispatching method and apparatus. According to the method of this application, a first robot is controlled to move to a second workstation and to place a required container of a second order to the second workstation after the first robot places a required container of a first order to the first workstation, so that the first robot can perform an operation of depositing containers across workstations during a single task of transporting containers. In this way, as many containers as possible can be placed on the workstations in the single task of transporting containers, which reduces times of retrieving and returning containers, thereby improving the overall efficiency and performance of an intelligent warehousing system.

18 Claims, 4 Drawing Sheets

Control a first robot to move to a second workstation after the first robot places a required container of a first order of a first workstation to the first workstation — S201

Control the first robot to place a required container of a second order of the second workstation to the second workstation, where the required container of the second order is a container matching an order requirement of the second order — S102

(51) Int. Cl.

| | | |
|---|---|---|
| *G05D 1/667* | (2024.01) | |
| *G05D 1/698* | (2024.01) | |
| *G06Q 10/08* | (2024.01) | |
| *G06Q 10/087* | (2023.01) | |
| G05D 105/28 | (2024.01) | |
| G05D 107/70 | (2024.01) | |

(52) U.S. Cl.
CPC .......... *G05D 1/667* (2024.01); *G05D 1/6987* (2024.01); *G06Q 10/08* (2013.01); *G06Q 10/087* (2013.01); *G05D 2105/28* (2024.01); *G05D 2107/70* (2024.01)

(58) Field of Classification Search
CPC .......... G05D 2105/28; G05D 2107/70; G05D 2109/10; G06Q 10/08; G06Q 10/087
See application file for complete search history.

(56) References Cited

U.S. PATENT DOCUMENTS

| | | | | |
|---|---|---|---|---|
| 10,894,664 | B1 * | 1/2021 | Brady | ................. G05D 1/0088 |
| 11,086,336 | B1 * | 8/2021 | Bolotski | .............. G05D 1/0212 |
| 2018/0043533 | A1 * | 2/2018 | Johnson | .............. G06Q 10/047 |
| 2018/0330325 | A1 * | 11/2018 | Sibley | ................... G05D 1/661 |
| 2018/0370728 | A1 * | 12/2018 | Gallagher | ........... G05D 1/0297 |
| 2020/0023765 | A1 * | 1/2020 | Lee | .................... G06Q 10/0838 |
| 2020/0096599 | A1 * | 3/2020 | Hewett | ................ G01S 13/878 |
| 2020/0302391 | A1 * | 9/2020 | Li | ...................... G06Q 10/0875 |
| 2022/0084153 | A1 * | 3/2022 | Johnson | ................. G06Q 10/00 |
| 2022/0280978 | A1 * | 9/2022 | Liu | ......................... B07C 3/006 |
| 2022/0288645 | A1 * | 9/2022 | Memon | .................. B07C 5/361 |
| 2022/0308586 | A1 * | 9/2022 | Bergman | ............. G05D 1/0088 |
| 2022/0324646 | A1 * | 10/2022 | Sohn | ................. G06Q 30/0601 |
| 2023/0202755 | A1 * | 6/2023 | Liu | ........................ B65G 1/065 |
| | | | | 700/214 |
| 2023/0399176 | A1 * | 12/2023 | Fu | .................... G05B 19/41865 |
| 2024/0043216 | A1 * | 2/2024 | Ai | .......................... G05D 1/667 |
| 2024/0160223 | A1 * | 5/2024 | Cesic | ....................... G05D 1/69 |
| 2024/0375871 | A1 * | 11/2024 | Zhang | ...................... B07C 3/00 |

FOREIGN PATENT DOCUMENTS

| | | |
|---|---|---|
| CN | 107025533 A | 8/2017 |
| CN | 108846609 A | 11/2018 |
| CN | 108891838 A | 11/2018 |
| CN | 109118137 A | 1/2019 |
| CN | 109359902 A | 2/2019 |
| CN | 109670900 A | 4/2019 |
| CN | 110040412 A | 7/2019 |
| CN | 110334994 A | 10/2019 |
| CN | 110921170 A | 3/2020 |
| CN | 210162595 U | 3/2020 |
| CN | 110949923 A | 4/2020 |
| CN | 111144786 A | 5/2020 |
| CN | 111646082 A | 9/2020 |
| CN | 112044784 A | 12/2020 |
| CN | 112330120 A | 2/2021 |
| CN | 112330249 A | 2/2021 |
| CN | 112478553 A | 3/2021 |
| CN | 112633756 A | 4/2021 |
| CN | 113044462 A | 6/2021 |
| JP | 2009-518258 A | 5/2009 |
| TW | M564204 U | 7/2018 |

OTHER PUBLICATIONS

The First Office Action issued on Jan. 10, 2024 for Taiwan Patent Application No. 111115279, with search report and its English translation.

* cited by examiner

Figure 1:
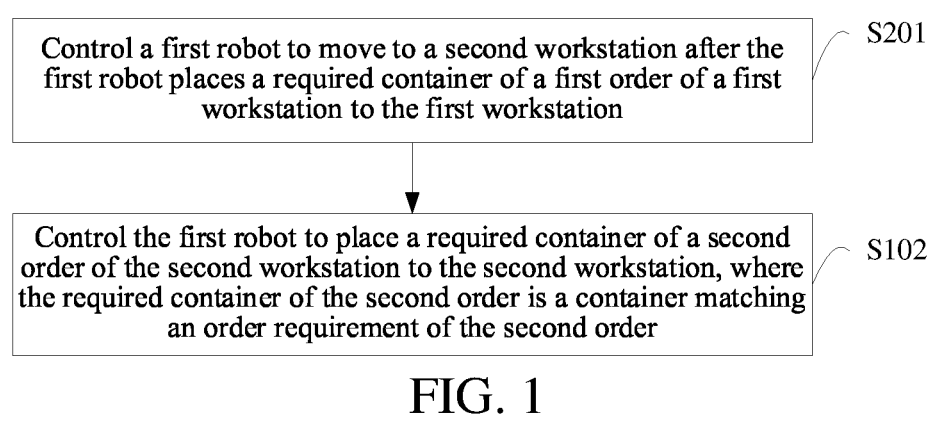

Control a first robot to move to a second workstation after the first robot places a required container of a first order of a first workstation to the first workstation

S201

Control the first robot to place a required container of a second order of the second workstation to the second workstation, where the required container of the second order is a container matching an order requirement of the second order

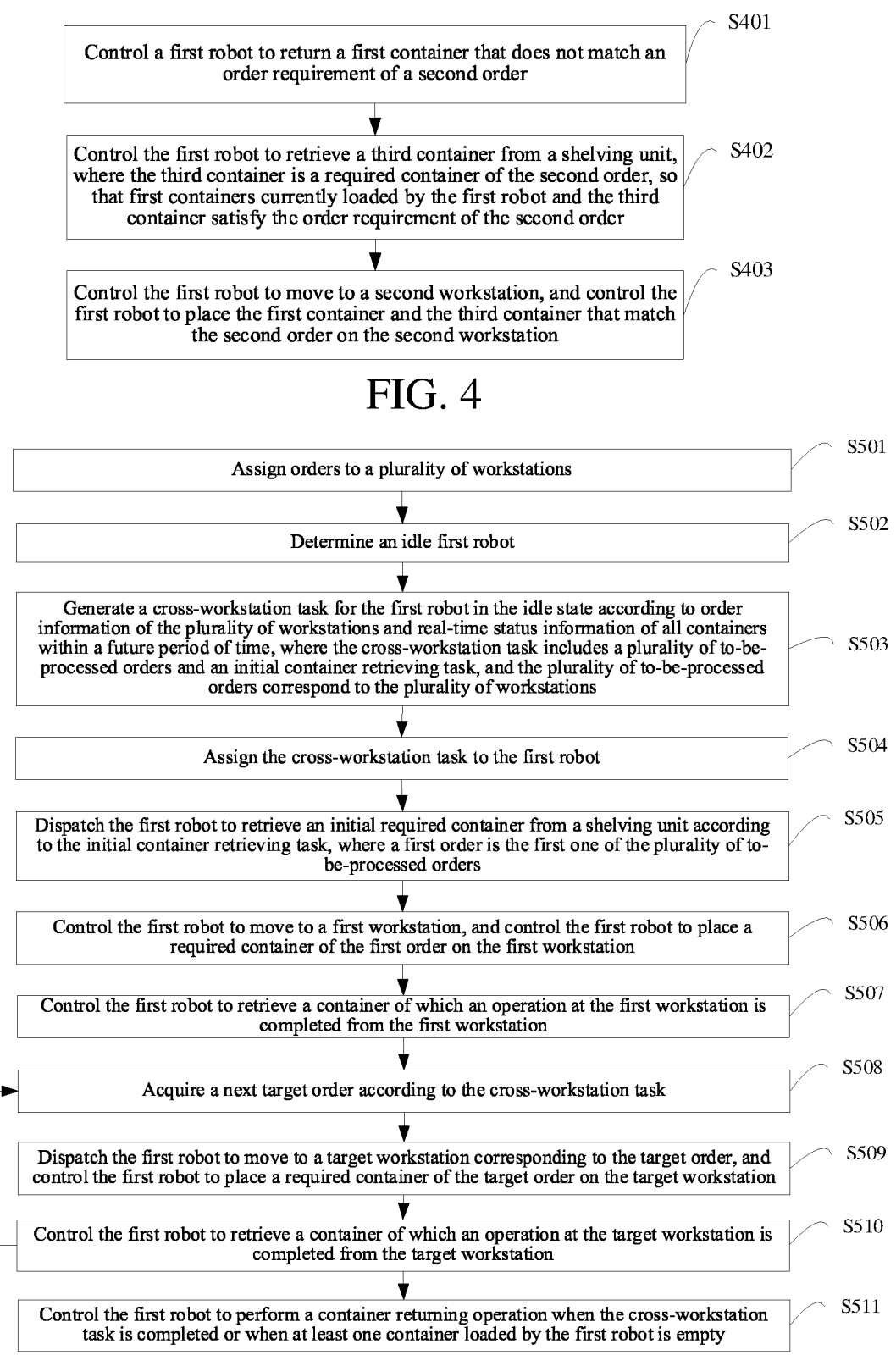

S401

Control a first robot to return a first container that does not match an order requirement of a second order

S402

Control the first robot to retrieve a third container from a shelving unit, where the third container is a required container of the second order, so that first containers currently loaded by the first robot and the third container satisfy the order requirement of the second order

S403

Control the first robot to move to a second workstation, and control the first robot to place the first container and the third container that match the second order on the second workstation

Assign orders to a plurality of workstations

S502

Determine an idle first robot

S503

Generate a cross-workstation task for the first robot in the idle state according to order information of the plurality of workstations and real-time status information of all containers within a future period of time, where the cross-workstation task includes a plurality of to-be-processed orders and an initial container retrieving task, and the plurality of to-be-processed orders correspond to the plurality of workstations

S504

Assign the cross-workstation task to the first robot

S505

Dispatch the first robot to retrieve an initial required container from a shelving unit according to the initial container retrieving task, where a first order is the first one of the plurality of to-be-processed orders

S506

Control the first robot to move to a first workstation, and control the first robot to place a required container of the first order on the first workstation

S507

Control the first robot to retrieve a container of which an operation at the first workstation is completed from the first workstation

S508

Acquire a next target order according to the cross-workstation task

S509

Dispatch the first robot to move to a target workstation corresponding to the target order, and control the first robot to place a required container of the target order on the target workstation

S510

Control the first robot to retrieve a container of which an operation at the target workstation is completed from the target workstation

S511

Control the first robot to perform a container returning operation when the cross-workstation task is completed or when at least one container loaded by the first robot is empty

FIG. 5

ROBOT DISPATCHING METHOD AND APPARATUS

CROSS-REFERENCE TO RELATED APPLICATIONS

This application is a continuation of PCT Patent Application No. PCT/CN2022/086410 filed on Apr. 12, 2022, which claims priority to Chinese Patent Application No. 202110444458.6 filed on Apr. 23, 2021, both of which are incorporated herein by reference in its entirety.

TECHNICAL FIELD

This application relates to intelligent warehousing technologies, and in particular, to a robot dispatching method and apparatus, a system, a storage medium, and a program product.

BACKGROUND

In the field of intelligent warehousing, it is becoming more and more common for robots to transfer goods instead of humans. In a goods-to-person system, a robot usually needs to transport a goods container to a designated position (a workstation) and then place the goods container back to a shelving unit area after an operation. A robot that can transfer a plurality of goods containers at one time usually adopts a "return before retrieve" policy. Specifically, the robot first places back goods containers that need to be placed back to the shelving unit area at one time, and then performs the task of transferring goods containers to the workstation. During the task of transferring the goods boxes to the workstation by the robot, the robot may not be in a high load state, resulting in a waste of robot utilization and affecting the overall efficiency and performance of an intelligent warehousing system.

SUMMARY

This application provides a robot dispatching method and apparatus, a system, a storage medium, and a program product.

According to a first aspect, this application provides a robot dispatching method, including:

controlling a first robot to move to a second workstation and controlling the first robot to place a required container of a second order of the second workstation on the second workstation after the first robot places a required container of a first order of a first workstation on the first workstation, where the required container of the second order is a container matching an order requirement of the second order.

Optionally, before the controlling the first robot to move to the second workstation after the first robot places a required container of the first order of the first workstation on the first workstation, the method further includes: controlling the first robot to retrieve a container from the first workstation, where an operation of the retrieved container has been completed at the first workstation.

Optionally, before the first robot places a required container of the first order of the first workstation on the first workstation, the method further includes: assigning a container retrieving task to the first robot, where the container retrieving task is used for instructing the first robot to retrieve required containers of a plurality of orders from a shelving unit, and the plurality of orders include at least the first order and the second order; and controlling the first robot to move to the first workstation, and controlling the first robot to place the required container of the first order on the first workstation.

Optionally, before the controlling the first robot to move to the second workstation and controlling the first robot to place the required container of the second order of the second workstation on the second workstation and after the first robot places a required container of the first order of the first workstation on the first workstation, the method further includes: determining third orders of a third workstation according to items in first containers currently loaded by the first robot and an order requirement of each of the workstations, where order requirements of the third orders match the items in at least one of the first containers; and using one of the third orders as the second order.

Optionally, the using one of the third orders as the second order includes: determining, according to evaluation parameter information for performing a real-time cross-workstation operation on the third orders, third orders that satisfy a real-time cross-workstation operation condition; and using one of the third orders that satisfy the real-time cross-workstation operation condition as the second order.

Optionally, the using one of the third orders that satisfy the real-time cross-workstation operation condition as the second order includes: using, if the number of the third orders that satisfy the real-time cross-workstation operation condition is 1, the third order that satisfies the real-time cross-workstation operation condition as the second order; and selecting, if the number of the third orders that satisfy the real-time cross-workstation operation condition is greater than 1, one of the third orders that satisfy the real-time cross-workstation operation condition as the second order according to the evaluation parameter information for performing the real-time cross-workstation operation on the third orders.

Optionally, the method further includes: determining a second container according to the order requirement of the second order and the items in the first containers if the first containers currently loaded by the first robot do not satisfy the order requirement of the second order, where the second container and the first containers satisfy the order requirement of the second order; dispatching a second robot to retrieve the second container from the shelving unit; and controlling the second robot to move to the second workstation, and controlling the second robot to place the second container on the second workstation.

Optionally, if no third order satisfies the real-time cross-workstation operation condition, using one of the third orders as the second order according to the number of first containers that match the order requirements of the third orders.

Optionally, the controlling the first robot to move to the second workstation and controlling the first robot to place the required container of the second order of the second workstation on the second workstation includes: controlling the first robot to return a first container that does not match the order requirement of the second order; controlling the first robot to retrieve a third container from the shelving unit, where the third container is the required container of the second order, so that the first containers currently loaded by the first robot and the third container satisfy the order requirement of the second order; and controlling the first robot to move to the second workstation, and controlling the first robot to place the first container and the third container matching the second order on the second workstation.

Optionally, the using one of the third orders as the second order according to the number of first containers matching the order requirements of the third orders if no third order satisfies the real-time cross-workstation operation condition includes: determining the number of first containers match- ing the order requirements of the third orders and using third orders in which the number of first containers matching the order requirement is greater than a preset number threshold as fourth orders if no third order satisfies the real-time cross-workstation operation condition; determining, accord- ing to evaluation parameter information for performing an indirect cross-workstation operation on the fourth orders, fourth orders that satisfy an indirect cross-workstation operation condition; and using one of the fourth orders that satisfy the indirect cross-workstation operation condition as the second order.

Optionally, whether the target order satisfies a corre- sponding cross-workstation operation condition is deter- mined according to evaluation parameter information for performing a cross-workstation operation on any of target orders, where the determining includes: determining, according to the evaluation parameter information for per- forming the cross-workstation operation on the target order and a threshold condition corresponding to each item of the evaluation parameter information, whether the target order satisfies the corresponding cross-workstation operation con- dition, where the target order is any of the third orders, the evaluation parameter information for performing the cross- workstation operation on the target order is evaluation parameter information for performing the real-time cross- workstation operation on the target order, and the corre- sponding cross-workstation operation condition is the real- time cross-workstation operation condition; or the target order is any of the fourth orders, the evaluation parameter information for performing the cross-workstation operation on the target order is evaluation parameter information for performing the indirect cross-workstation operation on the target order, and the corresponding cross-workstation opera- tion condition is the indirect cross-workstation operation condition.

Optionally, the determining, according to the evaluation parameter information for performing the cross-workstation operation on the target order and a threshold condition corresponding to each item of the evaluation parameter information, whether the target order satisfies the corre- sponding cross-workstation operation condition includes: determining that the target order satisfies the corresponding cross-workstation operation condition if each item of the evaluation parameter information of the target order satisfies the corresponding threshold condition.

Optionally, the determining, according to the evaluation parameter information for performing the cross-workstation operation on the target order and a threshold condition corresponding to each item of the evaluation parameter information, whether the target order satisfies the corre- sponding cross-workstation operation condition includes: determining that the target order satisfies the corresponding cross-workstation operation condition if at least one item of the evaluation parameter information of the target order satisfies the corresponding threshold condition.

Optionally, the determining, according to the evaluation parameter information for performing the cross-workstation operation on the target order and a threshold condition corresponding to each item of the evaluation parameter information, whether the target order satisfies the corre- sponding cross-workstation operation condition includes: determining that the target order satisfies the corresponding cross-workstation operation condition if at least one particu- lar parameter of the target order satisfies the corresponding threshold condition, where the particular parameter is one or more items pre-specified from the evaluation parameter information.

Optionally, whether the target order satisfies a corre- sponding cross-workstation operation condition is deter- mined according to evaluation parameter information for performing a cross-workstation operation on any of target orders, where the determining includes: determining, according to the evaluation parameter information for per- forming the cross-workstation operation on the target order, a score value corresponding to each item of the evaluation parameter information of the target order; and determining, according to the score value corresponding to each item of the evaluation parameter information of the target order, whether the target order satisfies the corresponding cross- workstation operation condition, where the target order is any of the third orders, the evaluation parameter information for performing the cross-workstation operation on the target order is evaluation parameter information for performing the real-time cross-workstation operation on the target order, and the corresponding cross-workstation operation condi- tion is the real-time cross-workstation operation condition; or the target order is any of the fourth orders, the evaluation parameter information for performing the cross-workstation operation on the target order is evaluation parameter infor- mation for performing the indirect cross-workstation opera- tion on the target order, and the corresponding cross-work- station operation condition is the indirect cross-workstation operation condition.

Optionally, the determining, according to the score value corresponding to each item of the evaluation parameter information of the target order, whether the target order satisfies the corresponding cross-workstation operation con- dition includes: determining a comprehensive score value of the target order according to the score value corresponding to each item of the evaluation parameter information of the target order; and determining, according to the comprehen- sive score value of the target order, whether the target order satisfies the corresponding cross-workstation operation con- dition.

Optionally, the determining, according to the score value corresponding to each item of the evaluation parameter information of the target order, whether the target order satisfies the corresponding cross-workstation operation con- dition includes: determining, if the evaluation parameter information of the target order includes benefit parameter information, a benefit score value of the target order accord- ing to a score value corresponding to each item of the benefit parameter information of the target order; determining, if the evaluation parameter information of the target order includes cost parameter information, a cost score value of the target order according to a score value corresponding to each item of the cost parameter information of the target order; and determining, according to the benefit score value and/or the cost score value of the target order, whether the target order satisfies the corresponding cross-workstation operation condition.

Optionally, the evaluation parameter information for per- forming the real-time cross-workstation operation on any of target orders includes benefit parameter information and/or cost parameter information. The benefit parameter informa- tion includes one or more of following items: the number of first containers with items matching an order requirement of the target order, a distance between the first workstation and a target workstation corresponding to the target order, an estimated waiting time of the first robot at the target work-station, and a degree of urgency of the target order. The cost parameter information includes one or more of following items: an idle time of the target workstation for which the target workstation waits before the first robot moves to the target workstation and completes the target order; and a time spent by the first robot in moving from the first workstation to the target workstation, and a time spent by the first robot in queuing at the target workstation.

Optionally, the evaluation parameter information for performing the indirect cross-workstation operation on any of target orders includes benefit parameter information and/or cost parameter information. The benefit parameter information includes one or more of following items: the number of first containers with items matching an order requirement of the target order; a distance between the first workstation and a first shelving unit where a first container that does not match the target order is located, a distance between the first shelving unit and a second shelving unit where a fourth container is located, and a distance between the second shelving unit and a target workstation corresponding to the target order, where items in the first container do not satisfy the order requirement of the target order, and items in the fourth container and the first container satisfy the order requirement of the target order; an estimated waiting time of the first robot at the target workstation; and a degree of urgency of the target order. The cost parameter information includes one or more of following items: an idle time of the target workstation for which the target workstation waits before the first robot moves to the target workstation and completes the target order; and a time spent by the first robot in moving from the first shelving unit to the second shelving unit and retrieving the fourth container, a time spent by the first robot in moving from the second shelving unit to the target workstation, and a time spent by the first robot in queuing at the target workstation.

Optionally, the second order is an order currently being executed by the second workstation or an order that is after the order currently being executed order and is not executed.

Optionally, before the first robot places a required container of the first order of the first workstation on the first workstation, the method further includes: generating a cross-workstation task for the first robot in an idle state according to the order information of the plurality of workstations and real-time status information of all of the containers within a future period of time, where the cross-workstation task includes a plurality of to-be-processed orders and an initial container retrieving task, and where the plurality of to-be-processed orders correspond to the plurality of workstations; and dispatching the first robot to retrieve an initial required container from a shelving unit according to the initial container retrieving task, where the first order is the first one of the plurality of to-be-processed orders.

Optionally, after the controlling the first robot to retrieve a container from the first workstation, where an operation of the retrieved container at the first workstation is completed, the method further includes: successively determining each next order of the plurality of to-be-processed orders as a target order according to the cross-workstation task, and performing the following cross-workstation operation on the target order: dispatching the first robot to move to a target workstation corresponding to the target order; controlling the first robot to place a required container of the target order on the target workstation; and controlling the first robot to retrieve a container at the target workstation, where an operation of the retrieved container at the target workstation is completed.

Optionally, controlling the first robot to perform a container returning operation when the cross-workstation task is completed or when at least one container loaded by the first robot is empty.

According to a second aspect, this application provides a robot dispatching apparatus, including:

a cross-workstation operating module, configured to control a first robot to move to a second workstation and control the first robot to place a required container of a second order of the second workstation to the second workstation after the first robot places a required container of a first order of a first workstation to the first workstation, where the required container of the second order is a container that matches an order requirement of the second order.

According to another aspect, this application provides a warehousing management system, including:

a memory, a processor, and a computer program stored in the memory and executable on the processor, where when the processor executes the computer program, the method according to any of the above is performed.

According to another aspect, this application provides a computer-readable storage medium, where the computer-readable storage medium stores a computer program that, when executed by a processor, performs the method according to any of the above.

According to another aspect, this application provides a computer program product, including a computer program that, when executed by a processor, performs the method according to any of the above.

According to the robot dispatching method and apparatus, the system, the storage medium, and the program product provided in this application, the first robot is controlled to move to the second workstation and to place the required container of the second order of the second workstation on the second workstation after the first robot places the required container of the first order of the first workstation on the first workstation, so that the first robot can perform an operation of placing containers across workstations during a single task of transporting containers. In this way, as many containers as possible can be placed on the workstations in a single task of transporting containers, which reduces times of retrieving/returning containers, and realizes a more flexible and efficient goods retrieving/placing policy, thereby improving the overall efficiency and performance of an intelligent warehousing system.

BRIEF DESCRIPTION OF THE DRAWINGS

The drawings herein, which are incorporated into the specification and constitute a part of the specification, illustrate embodiments that conform to this application and are used together with the specification to explain the principles of this application.

FIG. 1 is a flowchart of a robot dispatching method according to Embodiment I of this application.

FIG. 4 is a flowchart of a robot dispatching method according to Embodiment IV of this application.

FIG. 5 is a flowchart of a robot dispatching method according to Embodiment V of this application.

Figures 2, 3:
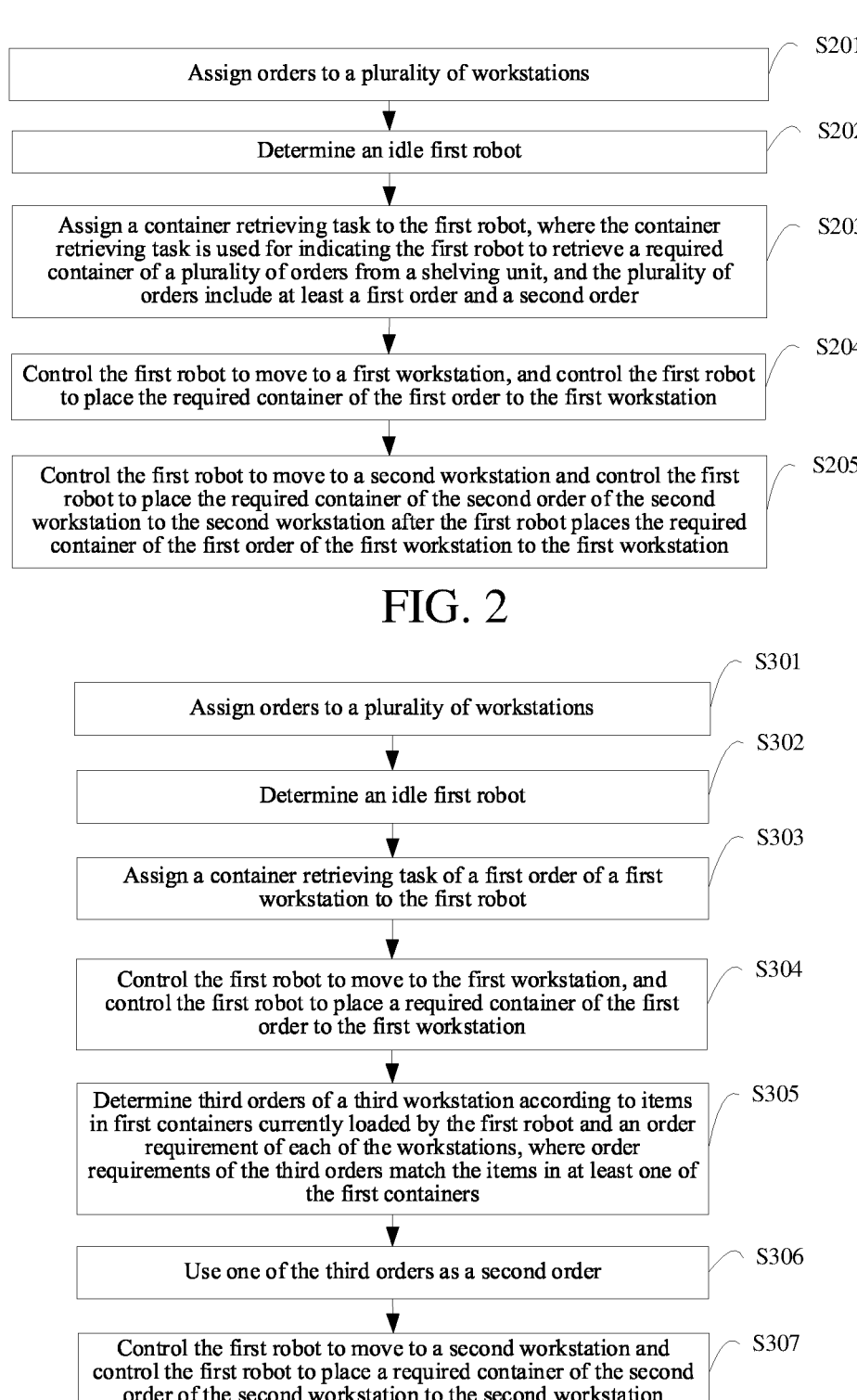
FIG. 2 is a flowchart of a robot dispatching method according to Embodiment II of this application.
FIG. 3 is a flowchart of a robot dispatching method according to Embodiment III of this application.

Specific embodiments of this application are shown by the above drawings, and more detailed description will be given below. These drawings and text description are not intended to limit the scope of the concept of this application in any way, but to illustrate the concept of this application for those skilled in the art by referring to specific embodiments.

DETAILED DESCRIPTION

Exemplary embodiments are described in detail herein, and examples of the exemplary embodiments are shown in the drawings. When the following description involves the drawings, unless otherwise indicated, the same numerals in different drawings represent the same or similar elements. The implementations described in the following exemplary embodiments do not represent all implementations consistent with this application. On the contrary, they are merely examples of apparatuses and methods consistent with some aspects of this application as detailed in the appended claims.

The terms such as "first", "second", and "third" in this application are merely used for description, and should not be understood as indicating or implying relative importance or implying the number of indicated technical features. Unless otherwise explicitly and specifically defined, in the description of the following various embodiments, "a plurality of" means more than two. The term "and/or" means any combination of listed items, including one or more of the listed items. The symbol "/" in embodiments of the application means "or".

The technical solutions of this application and how the technical solutions of this application resolve the above technical problems are described in detail below through the specific embodiments. The following specific embodiments may be combined with each other, and the same or similar concepts or processes may not be repeated in some embodiments. The embodiments of this application are described below with reference to the drawings.

In the field of intelligent warehousing, it is becoming more and more common for robots to transport goods instead of humans. In a goods-to-person system, a robot usually needs to transfer a container to a designated position (a workstation) and then place the container back to a shelving unit area after an operation. A robot that can transport a plurality of containers at one time usually adopts a "return before retrieve" policy. Specifically, the robot first places back containers that need to be placed back to the shelving unit area at one time, and then performs the task of transporting containers to the workstation. The "return before retrieve" policy is inflexible and inefficient, which cannot fully utilize the performance of an intelligent warehousing system. During the task of transferring the containers to the workstation by the robot, the robot may not be in a high load state, resulting in a waste of robot utilization.

A robot dispatching method provided in this application is intended to resolve the above technical problem, so as to improve the overall efficiency and performance of an intelligent warehousing system.

FIG. 1 is a flowchart of a robot dispatching method according to a first embodiment of this application. The robot dispatching method provided in this application is performed by a warehousing management system in the intelligent warehousing system. As shown in FIG. 1, the method specifically includes the following steps:

Step S101: controlling a first robot to move to a second workstation after the first robot places a required container of a first order of a first workstation to the first workstation.

The first robot is any robot that can perform a container retrieving task of a corresponding workstation. The first robot may be an autonomous case handling robot or other types of robots. No specific limitation is imposed herein.

The first workstation is any workstation, and the first order is any order of the first workstation. The second workstation is a workstation different from the first workstation.

In this embodiment, the first robot places the required container of the first order on the first workstation according to a container retrieving task of the first order of the first workstation, where the container retrieving task is assigned to the first robot.

After the first robot places the required container of the first order of the first workstation on the first workstation, that is, after the first robot completes the container retrieving task of the first order of the first workstation, if a required container of a second order of the second workstation exists in containers currently loaded by the first robot, a warehousing management system temporarily does not instruct the first robot to perform a container returning task. Instead, the warehousing management system controls the first robot to move to the second workstation for a cross-workstation operation according to an inventory in the containers currently loaded by the first robot.

Step S102: controlling the first robot to place a required container of a second order of the second workstation to the second workstation, where the required container of the second order is a container matching an order requirement of the second order.

After the first robot moves to the second workstation, the warehousing management system controls the first robot to place the required container of the second order of the second workstation on the second workstation, so that the first robot can perform an operation of depositing containers across workstations during a single task of transferring goods containers. In this way, as many containers as possible can be placed on the workstations in a single task of transporting containers, which realizes a more flexible and efficient goods retrieving and depositing policy, thereby improving the overall efficiency and performance of the intelligent warehousing system.

In this embodiment of this application, after the first robot places a required container of the first order of the first workstation on the first workstation, the first robot is controlled to move to the second workstation and is controlled to place the required container of the second order of the second workstation on the second workstation, so that the first robot can perform an operation of placing containers across workstations during a single task of transporting containers. In this way, as many containers as possible can be placed on the workstations in a single task of transporting containers, which reduces times of retrieving/returning containers, and realizes a more flexible and efficient goods retrieving and depositing policy, thereby improving the overall efficiency and performance of an intelligent warehousing system.

FIG. 2 is a flowchart of a robot dispatching method according to a second embodiment of this application. Based on the above first embodiment, this embodiment provides an example of the robot dispatching method, to realize a basic process of a cross-workstation operation for an autonomous case handling robot. As shown in FIG. 2, the method includes the following specific steps:

Step S201: assigning orders to a plurality of workstations.

A specific application scenario of this embodiment is as follows: a plurality of workstations are arranged in the intelligent warehousing system. In order to improve the order processing efficiency and timeliness, when there are a plurality of orders, the plurality of orders are assigned to the plurality of workstations instead of assigning all orders to a single workstation.

A specific implementation of assigning the orders to the workstations may be realized by using any of methods in the prior art. Details are not described herein.

Step S202: determining an idle first robot.

In an actual application, before assigning container retrieving tasks corresponding to orders, an idle robot is selected so as to assign container retrieving tasks.

Step S203: assigning a container retrieving task to the first robot. The container retrieving task is used for instructing the first robot to retrieve required containers of a plurality of orders from a shelving unit. The plurality of orders include at least a first order and a second order.

In this embodiment, the warehousing management system assigns a container retrieving task to the idle first robot according to the required containers of the plurality of orders. When the first robot performs the container retrieving task, the first robot retrieves the required containers of the plurality of orders from a rack.

The plurality of orders correspond to the plurality of workstations. The plurality of orders include at least the first order of the first workstation and the second order of the second workstation.

Step S204: controlling the first robot to move to the first workstation, and controlling the first robot to place the required containers of the first order to the first workstation.

After the first robot retrieves the required containers of the plurality of orders in the task from the rack according to the container retrieving task, the warehousing management system controls the first robot to move to the first workstation, and controls the first robot to place the required containers of the first order to the first workstation.

Step S205: after the first robot places the required container of the first order of the first workstation to the first workstation, controlling the first robot to move to the second workstation and control the first robot to place the required container of the second order of the second workstation to the second workstation.

The required container of the second order is the container which matches the order demand of the second order.

After the first robot places the required container of the first order of the first workstation on the first workstation, since the required container of the second order of the second workstation exists in containers currently loaded by the first robot, the warehousing management system temporarily does not instruct the first robot to perform a task of returning containers. Instead, the warehousing management system controls the first robot to move to the second workstation and controls the first robot to place the required container of the second order of the second workstation on the second workstation according to the containers currently loaded by the first robot, so that the first robot retrieves the required containers of the orders of the plurality of workstations through one single operation process of retrieving containers, and performs an operation of depositing containers across workstations. In this way, as many containers as possible can be placed on the plurality of workstations in a single task of transferring containers, which realizes a more flexible and efficient goods retrieving and depositing policy, thereby improving the overall efficiency and performance of an intelligent warehousing system.

Optionally, after the first robot places the required container of the first order of the first workstation on the first workstation, and before the first robot is controlled to move to the second workstation, the warehousing management system may further control the first robot to retrieve a container of which an operation at the first workstation is completed from the first workstation.

In an optional implementation of this embodiment, if a first container currently loaded by the first robot do not satisfy the order requirement of the second order, the warehousing management system may determine a second container according to the order requirement of second order and inventory items in the first container. The second container and the first container satisfy the order requirement of the second order. A second robot is dispatched to retrieve the second container from the shelving unit. The second robot is controlled to move to the second workstation, and is controlled to place the second container on the second workstation, which can timely transport the container required by the second order to the second workstation, shorten the processing time of the second order, and improve the efficiency. This process may be performed in parallel with step S205 to further improve the processing efficiency of the second order.

Further, after the first robot places the required container of the second order of the second workstation on the second workstation, the first robot may be controlled to move to a next workstation, and is controlled to place a required container of an order of the next workstation on the next workstation. The operation is repeated until the first robot completes the container depositing operation for all of the required containers of all of the orders in the container retrieving task assigned in step S203.

In this embodiment of this application, the container retrieving task is assigned to the first robot, where the container retrieving task is used for instructing the first robot to retrieve the required containers of the plurality of orders from the shelving unit. The plurality of orders include at least the first order and the second order. The first robot is controlled to move to the first workstation and to place the required container of the first order on the first workstation. After the first robot places the required container of the first order of the first workstation on the first workstation, the first robot is controlled to move to the second workstation and to place the required container of the second order of the second workstation on the second workstation, so that the first robot can retrieve the required containers of the orders of the plurality of workstations through a single operation process of retrieving containers, and can perform an operation of depositing containers across workstations. In this way, the first robot can place as many containers as possible on the plurality of workstations in a single task, which reduces times of retrieving/returning containers, and realizes a more flexible and efficient goods retrieving and depositing policy, thereby improving the overall efficiency and performance of an intelligent warehousing system.

FIG. 3 is a flowchart of a robot dispatching method according to a third embodiment of this application. Based on the above first embodiment, this embodiment provides another example of the robot dispatching method, to realize a process of a real-time cross-workstation operation of an autonomous case handling robot. As shown in FIG. 3, the method includes the following specific steps:

Step S301: assigning orders to a plurality of workstations.

An implementation of this step is the same as that of step S201.

Step S302: determining an idle first robot.

An implementation of this step is the same as that of step S202.

Step S303: assigning a container retrieving task of the first order of the first workstation to the first robot.

In this embodiment, the warehousing management system assigns a container retrieving task of an order (the first order of the first workstation) to the first robot. The container retrieving task is used for instructing the first robot to retrieve the required container of the first order from the shelving unit.

The first workstation is any workstation, and the first order is any order of the first workstation.

Optionally, in another implementation of this embodiment, the warehousing management system may implement this step in the way of step S203, so that the first robot can continuously perform a cross-workstation operation for more workstations after a single operation process of retrieving containers.

Step S304: controlling the first robot to move to the first workstation, and controlling the first robot to place the required container of the first order to the first workstation.

After the first robot retrieves the required containers of the plurality of orders in the task from the shelving unit according to the container retrieving task, the warehousing management system controls the first robot to move to the first workstation, and controls the first robot to place the required containers of the first order to the first workstation.

Step S305: determining third orders of a third workstation according to inventory items in a first container currently loaded by the first robot and an order demand of each of the workstations, where order demand of the third orders matches the inventory items in at least one of the first containers.

In this embodiment, after the first robot places the required containers of the first order of the first workstation on the first workstation, the warehousing management system may match a next workstation and an order for the first robot to perform a cross-workstation operation in real time according to an inventory of the containers currently loaded by the first robot through steps S305-S306.

Optionally, after the first robot places the required containers of the first order of the first workstation on the first workstation, and before step S305, the warehousing management system may further control the first robot to retrieve a container of which an operation at the first workstation is completed from the first workstation, so as to increase containers loaded by the first robot, so that the first robot can continuously perform the cross-workstation operation for more workstations.

In this step, the warehousing management system determines, according to the items in the first containers currently loaded by the first robot and the order demand of each of the workstations, the third orders having order requirements which match the items in at least one of the first containers by analyzing whether the items in the containers loaded by the robot match the order requirement of each of the workstations. A workstation corresponding to the third orders is the third workstation.

In this step, if the items in the first containers loaded by the first robot do not match the order requirement of all of the workstations, the cross-workstation operation is not performed, and the first robot is controlled to perform an operation of returning containers.

Step S306: using one of the third orders as the second order.

After all third orders are determined, one of the third orders is selected as a next order, that is, the second order for the first robot to perform the cross-workstation operation.

In an optional implementation of this step, one of the third orders may be selected randomly as the second order.

Another optional implementation of this step may be implemented in the following way:

determining, according to evaluation parameter information for performing a real-time cross-workstation operation on the third orders, third orders that satisfy a real-time cross-workstation operation condition; and using one of the third orders that satisfy the real-time cross-workstation operation condition as the second order.

In this embodiment, evaluation parameter information for performing the real-time cross-workstation operation on any of target orders includes benefit parameter information and/or cost parameter information.

The benefit parameter information includes one or more of following items:

the number of first containers with items matching an order requirement of the target order, a distance between the first workstation and a target workstation corresponding to the target order, an estimated waiting time of the first robot at the target workstation, and a degree of urgency of the target order.

The cost parameter information includes one or more of following items:

an idle time of the target workstation for which the target workstation waits before the first robot moves to the target workstation and completes the target order; a time spent by the first robot in moving from the first workstation to the target workstation, and a time spent by the first robot in queuing at the target workstation.

In order to facilitate understanding, two items of cost parameter information are successively described. In a specific application scenario, a cost waste of the target workstation corresponding to the target order caused by a real-time cross-workstation operation on the target order is as follows: when an operating robot of the target workstation is switched to the cross-workstation first robot, or the first robot cuts in a queue sequence, if the cross-workstation first robot has not reached the target workstation, a robot with a priority lower than that of the first robot needs to wait, which results in an idle time of the target workstation. Alternatively, the target workstation switches an operation order. After an original operation order is suspended/delayed, a robot for the suspended/delayed order needs to suspend the operation and wait for the cross-workstation first robot and completion of its corresponding target order. During the process of switching, the target workstation is idle. The above are considered as a time cost waste of the target workstation.

A robot waste cost caused by the real-time cross-workstation operation on the target order is as follows: when the first robot moves from the first workstation to the target workstation, the first robot spends time in moving to the target workstation and time in queuing at the target workstation. These time is spent for a task of returning/retrieving a container in a regular operation. The task needs to be delayed, or abandoned, or assigned to other robots due to shifting between the workstations, which is considered as time cost waste for a robot.

Further, based on the above evaluation parameter information for performing the real-time cross-workstation operation on any of the target orders, whether the target order satisfies the real-time cross-workstation operation condition is determined according to the evaluation parameter information for performing the real-time cross-workstation operation on the target order by using each of the third orders as the target order, so as to determine all third orders that satisfy the real-time cross-workstation operation condition.

Determining, according to evaluation parameter information for performing a cross-workstation operation on any of target orders, whether the target order satisfies a corresponding cross-workstation operation condition may be specifically implemented in any of the following ways:

A first way is: determining, according to the evaluation parameter information for performing the cross-workstation operation on the target order and a threshold condition corresponding to each item of the evaluation parameter information, whether the target order satisfies the corresponding cross-workstation operation condition.

The target order is any of the third orders, the evaluation parameter information for performing the cross-workstation operation on the target order is evaluation parameter information for performing the real-time cross-workstation operation on the target order, and the corresponding cross-workstation operation condition is the real-time cross-workstation operation condition.

In the first way, conditional evaluation is adopted. Each item of the evaluation parameter information has a corresponding threshold condition, which includes the following ways of satisfaction in descending order of strictness: all conditions satisfied, some conditions satisfied, and preferential conditions satisfied.

Exemplarily, the way of "all conditions satisfied" is: determining that the target order satisfies the corresponding cross-workstation operation condition if each item of the evaluation parameter information of the target order satisfies the corresponding threshold condition.

Exemplarily, the way of "some conditions satisfied" is: determining that the target order satisfies the corresponding cross-workstation operation condition if at least one item of the evaluation parameter information of the target order satisfies the corresponding threshold condition.

A preferential condition means that when a particular item of the evaluation parameter information satisfies a corresponding threshold condition, for example, when a second order of the second workstation is highly urgent, a cross-workstation task is preferentially performed to complete the second order of a second workstation even if other conditions have an excessively low benefit or an excessively high cost.

Exemplarily, the way of "preferential conditions satisfied" is: determining that the target order satisfies the corresponding cross-workstation operation condition if at least one particular parameter information of the target order satisfies the corresponding threshold condition, where the particular parameter information is one or more items of the pre-specified evaluation parameter information.

A second way is: determining, according to the evaluation parameter information for performing the cross-workstation operation on the target order, a score value corresponding to each item of the evaluation parameter information of the target order; and determining, according to the score value corresponding to each item of the evaluation parameter information of the target order, whether the target order satisfies the corresponding cross-workstation operation condition.

The target order is any of the third orders, the evaluation parameter information for performing the cross-workstation operation on the target order is evaluation parameter information for performing the real-time cross-workstation operation on the target order, and the corresponding cross-workstation operation condition is the real-time cross-workstation operation condition.

In the second way, scoring evaluation method is adopted. A corresponding score value is established for each condition, and it is determined whether the target order satisfies the real-time cross-workstation operation condition depending on whether a total score reaches a score threshold.

Specifically, a comprehensive score value of the target order is determined according to the score value corresponding to each item of the evaluation parameter information of the target order; and it is determined according to the comprehensive score value of the target order whether the target order satisfies the corresponding cross-workstation operation condition.

Exemplarily, the score values corresponding to all items of the evaluation parameter information of the target order are summed to obtain the comprehensive score value of the target order. Alternatively, weighted summation is performed on the score values corresponding to all items of the evaluation parameter information of the target order to obtain the comprehensive score value of the target order. Alternatively, the comprehensive score may be determined based on a plurality of other scores based on an object. No specific limitation is imposed herein.

Further, the determining whether the target order satisfies the corresponding cross-workstation operation condition according to the comprehensive score value of the target order includes:

determining, if the evaluation parameter information of the target order includes benefit parameter information, a benefit score value of the target order according to a score value corresponding to each item of the benefit parameter information of the target order; determining, if the evaluation parameter information of the target order includes cost parameter information, a cost score value of the target order according to a score value corresponding to each item of the cost parameter information of the target order; and determining, according to the benefit score value and/or the cost score value of the target order, whether the target order satisfies the corresponding cross-workstation operation condition.

Exemplarily, the benefit score value may be calculated alone for the benefit parameter information, and it is determined whether the target order satisfies the real-time cross-workstation operation condition depending on whether the benefit score value reaches a benefit threshold. If the benefit score value reaches the benefit threshold, it is determined that the target order satisfies the real-time cross-workstation operation condition. If the benefit score value does not reach the benefit threshold, it is determined that the target order does not satisfy the real-time cross-workstation operation condition.

Exemplarily, the cost score value may be calculated alone for the cost parameter information, and it is determined whether the target order satisfies the real-time cross-workstation operation condition depending on whether the cost score value is less than a cost threshold. If the cost score value is less than the cost threshold, it is determined that the target order satisfies the real-time cross-workstation operation condition. If the cost score value is greater than or equal to the cost threshold, it is determined that the target order does not satisfy the real-time cross-workstation operation condition.

Exemplarily, the benefit score value and the cost score value are calculated respectively. If the benefit score value reaches the benefit threshold and the cost score value is less than the cost threshold, it is determined that the target order satisfies the real-time cross-workstation operation condition. If the benefit score value does not reach the benefit threshold, or the cost score value is greater than or equal to the cost threshold, it is determined that the target order does not satisfy the real-time cross-workstation operation condition.

Exemplarily, the benefit score value and the cost score value are calculated respectively, and it is determined whether the target order satisfies the real-time cross-workstation operation condition depending on whether the benefit score value is greater than the cost score value. If the benefit score value is greater than the cost score value, it is determined that the target order satisfies the real-time cross-workstation operation condition. If the benefit score value is less than or equal to the cost score value, it is determined that the target order does not satisfy the real-time cross-workstation operation condition.

In addition, it is determined whether the target order satisfies the real-time cross-workstation operation condition depending on whether a difference between the benefit score value and the cost score value is within a threshold range. A specific policy for determining whether the target order satisfies the real-time cross-workstation operation condition may be set and adjusted according to an actual application scenario. No specific limitation is imposed herein in this embodiment.

Further, after the third orders that satisfy the real-time cross-workstation operation condition are determined, if the number of the third orders that satisfy the real-time cross-workstation operation condition is 1, the third order that satisfies the real-time cross-workstation operation condition is used as the second order.

If the number of the third orders that satisfy the real-time cross-workstation operation condition is greater than 1, one order of is selected as the second order from the third orders that satisfy the real-time cross-workstation operation condition according to the evaluation parameter information for performing the real-time cross-workstation operation on the third orders.

If a plurality of third orders satisfy the real-time cross-workstation operation condition, an optimal one of the orders may be selected as the second order according to the evaluation parameter information for performing the real-time cross-workstation operation on the third orders.

For example, based on conditional evaluation, an order with the largest number of items of the evaluation parameter information satisfying the corresponding threshold conditions may be selected as the second order. Alternatively, a priority may be set for each item of the evaluation parameter information. Screening for third orders of which each evaluation parameter satisfies a corresponding threshold condition is successively performed according to the evaluation parameter in descending order of priorities, and at least one third order is obtained when the screening ends. One of the obtained orders is randomly selected as the second order.

Exemplarily, based on scoring evaluation, an order with the highest comprehensive score value may be selected, or an order with the highest benefit score value may be selected, or an order with the lowest cost score value may be selected, or an order may be selected in comprehensive consideration of a benefit score value and a cost score value, or the like. No specific limitation is imposed herein in this embodiment.

Optionally, if no third order satisfies the real-time cross-workstation operation condition, one of the third orders is selected as the second order according to the number of the first containers which match the order requirements of the third orders. For example, a third order having an order requirement that matches the largest number of first containers may be used as the second order. If a plurality of third orders have the order requirement matching the largest number of first containers, one order is randomly selected as the second order.

Step S307: controlling the first robot to move to the second workstation and controlling the first robot to place the required container of the second order of the second workstation to the second workstation.

After determining the second order of the second workstation for the first robot to perform the cross-workstation operation, the warehousing management system controls the first robot to move to the second workstation, and controls the first robot to place the requested container of the second order of the second workstation on the second workstation.

Further, after the first robot places the requested container of the second order of the second workstation on the second workstation, the steps S305-S307 are further performed. A second order of a next second workstation is determined according to the inventory items of the first container currently loaded by the first robot and the order demand of each of the workstations. The first robot is controlled to move to the next second workstation and is controlled to place a required container of the second order of the next second workstation on the next second workstation. The operation is repeated, until the first robot satisfies a cross-workstation operation termination condition.

The cross-workstation operation termination condition may be that at least one container loaded by the first robot is empty or there is no second order satisfying the real-time cross-workstation operation condition. The cross-workstation operation termination condition may be set and adjusted according to a demand of an actual application scenario, and no specific limitation is imposed herein in this embodiment.

In an optional implementation of this embodiment, after the second order is determined, the warehousing management system may further determine whether the first containers currently loaded by the first robot satisfy the order demand of the second order. The first containers satisfying the order demand of the second order means that the items in the first containers can contain all items in the order requirement of the second order.

If the first containers currently loaded by the first robot do not satisfy the order requirement of the second order, a second container is determined according to the order requirement of the second order and the items in the first containers, where the second container and the first containers satisfy the order requirement of the second order. A second robot is dispatched to retrieve the second container from the shelving unit. The second robot is controlled to move to the second workstation, and is controlled to place the second container on the second workstation, which can timely move the container required by the second order to the second workstation, shorten the processing time of the second order, and improve the efficiency. The process may be performed in parallel with step S307 to further improve the processing efficiency of the second order.

In addition, in this embodiment, the second order of the second workstation where the first robot performs cross-workstation operation may be an order currently being executed by the second workstation or an order which is provided after the order currently being executed and has not been executed.

In this embodiment of this application, after the first robot places the required container of the first order of the first workstation on the first workstation, the third orders are matched for the first robot in real time according to the items in the first containers currently loaded by the first robot. It is evaluated whether the third orders satisfy the real-time cross-workstation operation condition according to the evaluation parameter information for performing the real-time cross-workstation operation for the third orders. One of the third orders that satisfy the real-time cross-workstation operation conditions is selected as the second order of the second workstation for the first robot to perform the cross-workstation operation. In this way, the order of the next workstation can be matched for the first robot in real time for the cross-workstation operation based on evaluation results of a benefit and a cost of the cross-workstation operation on the orders of each of the workstations, which can further improve the efficiency and performance of the cross-workstation operation for the robot, thereby further improving the overall efficiency and performance of the intelligent warehousing system.

FIG. 4 is a flowchart of a robot dispatching method according to a fourth embodiment of this application. Based on the above first embodiment or third embodiment, this embodiment provides another example of the robot dispatching method, to realize a process of an indirect cross-workstation operation of an autonomous case handling robot.

In an optional implementation of this embodiment, based on the above first embodiment, the first robot is controlled to move to the second workstation and to place the required container of the second order of the second workstation on the second workstation, which may be implemented in the following way: controlling the first robot to return a first container that does not match the order demand of the second order; controlling the first robot to retrieve a third container from the shelving unit, where the third container is the required container of the second order, so that the first container and the third container currently loaded by the first robot satisfy the order requirement of the second order; and controlling the first robot to move to the second workstation, and controlling the first robot to place the first container and the third container that match the second order on the second workstation.

In another optional implementation of this embodiment, based on the above third embodiment, if no third order satisfies the real-time cross-workstation operation condition, after one of the third orders is selected as the second order according to the number of first containers matching the order requirements of the third orders, the first robot is controlled to move to the second workstation and to place the required container of the second order of the second workstation on the second workstation, which is implemented in the following way: controlling the first robot to return a first container that does not match the order requirement of the second order; controlling the first robot to retrieve a third container from the shelving unit, where the third container is the required container of the second order, so that the first container and the third container currently loaded by the first robot satisfy the order requirement of the second order; and controlling the first robot to move to the second workstation, and controlling the first robot to place the first container and the third container that match the second order on the second workstation.

In this implementation, according to the first containers currently loaded by the first robot, if it is determined that no third order satisfies the real-time cross-workstation operation condition according to the first containers loaded by the first robot, the warehousing dispatching system instructs the first robot to perform an indirect cross-workstation operation.

Optionally, in order to improve the efficiency of the indirect cross-workstation operation for the first robot, whether each order satisfies an indirect cross-workstation operation condition may be re-evaluated based on evaluation parameter information for performing an indirect cross-workstation operation on each order, and an optimal next workstation and order are selected for the indirect cross-workstation operation.

The next workstation for the indirect cross-workstation operation may be re-selected. The warehousing management system may change a task of returning, retaining, or retrieving a container, or a task of moving to the target workstation when determining that there is a more suitable target workstation according to the first containers loaded by the first robot.

The order of the workstation for the indirect cross-workstation operation may be re-selected. Since the first robot requires time to perform an operation of returning/retrieving containers, if it is estimated that the time is not enough for a corresponding to-be-executed order of each workstation at that time, order information of the workstation after the order executed on each workstation at that time (for example, the next order of the order being executed at that time, or the next of the next order of the order being executed at that time) may be evaluated based on the time of the operation of returning/retrieving containers. If there is still an order matching the first containers loaded by the robot, the first robot is instructed to perform a task of returning, retaining, or retrieving a container, or a task of moving to the target workstation corresponding to an order after the order of the target workstation executed at that time (for example, the next order of the order being executed at that time, or the next of the next order of the order being executed at that time).

In this embodiment, the second order of the second workstation where the first robot performs cross-workstation operation may be an order currently being executed by the second workstation, or an order which is after the order currently being executed order and is not executed.

Specifically, if no third order satisfies the real-time cross-workstation operation condition, one of the third orders is selected as the second order according to the number of the first containers matching the order requirements of the third orders, which may be implemented in the following way:

determining the number of the first containers matching the order requirements of the third orders and using third orders in which the quantity of the first containers matching the order requirement is greater than a preset number threshold as fourth orders if no third order satisfies the real-time cross-workstation operation condition; determining, according to evaluation parameter information for performing an indirect cross-workstation operation on the fourth orders, fourth orders that satisfy an indirect cross-workstation operation condition; and using one of the fourth orders that satisfy the indirect cross-workstation operation condition as the second order.

The preset number threshold may be set and adjusted according to a demand of an actual application scenario, and no specific limitation is imposed herein in this embodiment.

Further, if the number of the fourth orders that satisfy the indirect cross-workstation operation condition is 1, the fourth order that satisfies the indirect cross-workstation operation condition is used as the second order.

If the number of the fourth orders that satisfy the indirect cross-workstation operation condition is greater than 1, one of the fourth orders that satisfy the indirect cross-workstation operation condition is selected as the second order according to the evaluation parameter information for performing the indirect cross-workstation operation on the fourth orders.

Optionally, if a plurality of fourth orders satisfy the indirect cross-workstation operation condition, an optimal one of the orders may be selected as the second order according to the evaluation parameter information for performing the indirect cross-workstation operation on the fourth orders.

For example, based on conditional evaluation, an order with the largest number of items of the evaluation parameter information satisfying the corresponding threshold conditions may be selected as the second order. Alternatively, a priority may be set for each item of the evaluation parameter information. Screening for fourth orders of which each evaluation parameter satisfies a corresponding threshold condition is successively performed according to the evaluation parameter in descending order of priorities, and at least one fourth order is obtained when the selection ends. One of the obtained orders is randomly selected as the second order.

Exemplarily, based on scoring evaluation, an order with the highest comprehensive score value may be selected, or an order with the highest benefit score value may be selected, or an order with the lowest cost score value may be selected, or an order may be selected in comprehensive consideration of a benefit score value and a cost score value, or the like. No specific limitation is imposed herein in this embodiment.

Optionally, if no fourth order satisfies the indirect cross-workstation operation condition, one of the third orders is selected as the second order according to the number of containers matching the order requirements of the third orders.

For example, a third order having an order requirement matching the largest quantity of first containers may be used as the second order. If a plurality of third orders have the order demand matching the largest number of first containers, one order is randomly selected as the second order.

In this implementation, the fourth orders that satisfy the indirect cross-workstation operation condition are determined according to the evaluation parameter information for performing the indirect cross-workstation operation on the fourth orders, and whether the target order satisfies the indirect cross-workstation operation condition may be determined according to the evaluation parameter information for performing the indirect cross-workstation operation on the target order by using each of the fourth orders as the target order, so as to determine all fourth orders that satisfy the indirect cross-workstation operation condition.

Two implementations of a process of determining, according to evaluation parameter information for performing the cross-workstation operation on any of target orders, whether the target order satisfies the corresponding cross-workstation operation condition are similar to the implementation of determining, according to the evaluation parameter information for performing the cross-workstation operation on any of the target orders, whether the target order satisfies the corresponding cross-workstation operation condition in step S306 in the above third embodiment, and therefore the details are not described in this embodiment. Different from the second embodiment, in this embodiment, the target order is any of the fourth orders, the evaluation parameter information for performing the cross-workstation operation on the target order is the evaluation parameter information for performing the indirect cross-workstation operation on the target order, and the corresponding cross-workstation operation condition is the indirect cross-workstation operation condition.

Evaluation parameter information for performing the indirect cross-workstation operation on any of target orders includes benefit parameter information and/or cost parameter information.

The benefit parameter information for performing the indirect cross-workstation operation on any of the target orders includes one or more of following items:

the number of first containers with inventory items matching an order requirement of the target order; a distance between a first shelving unit where a first container that does not match the target order is located and the first workstation, a distance between the first shelving unit and a second shelving unit where a fourth container is located, and a distance between the second shelving unit and a target workstation corresponding to the target order, where inventory items in the first container do not satisfy the order requirement of the target order, and the inventory items in the first container and the fourth container satisfy the order requirement of the target order; an estimated waiting time of the first robot at the target workstation; and a degree of urgency of target order.

The cost parameter information for performing the indirect cross-workstation operation on any of the target orders includes one or more of following items:

an idle time of the target workstation for which the target workstation waits before the first robot moves to the target workstation and completes the target order; a time spent by the first robot in moving from the first shelving unit to the second shelving unit and retrieving the fourth container, a time spent by the first robot in moving from the second shelving unit to the target workstation, and a time spent by the first robot in queuing at the target workstation.

To sum up, the control of the first robot to move to the second workstation and to place the required container of the second order of the second workstation on the second workstation in step S205 in the above second embodiment and step S307 in the above third embodiment may be implemented through the following steps (as shown in FIG. 4):

Step S401: controlling the first robot to return a first container that does not match the order requirement of the second order.

In this embodiment, when the first robot places the required container of the first order of the first workstation on the first workstation, the first robot neither performs an operation of returning containers, nor directly performs the real-time cross-workstation operation, but instead performs the indirect cross-workstation operation process in steps S401-S403.

When performing the indirect cross-workstation operation process, the first robot first performs the container returning operation to return the first container that does not match the order demand of the second order.

Step S402: controlling the first robot to pick a third container from the shelving unit, where the third container is the required container of the second order, so that the first containers currently loaded by the first robot and the third container satisfy the order requirement of the second order.

After the first container that does not match the order requirement of the second order is returned, in order that the first containers loaded by the first robot satisfy the order requirement of the second order of the second workstation, the warehousing management system dispatches and controls the first robot to retrieve the third container (that is, other required container of the second order) from the shelving unit. Therefore, the containers loaded by the first robot satisfy the order demand of the second order.

Step S403: controlling the first robot to move to the second workstation, and control the first robot to place the first container and the third container that match the second order on the second workstation.

After the first robot picks the third container, the containers loaded by the first robot satisfy the order requirement of the second order. The warehousing management system controls the first robot to move to the second workstation, and controls the first robot to place the first container and the third container that match the second order on the second workstation, so that all required containers of the second order can be transported to the second workstation through a single transport task of the first robot without a need to dispatch other robots to perform the task of retrieving the third container of the second order. In this way, the utilization of the first robot is improved, and the processing efficiency of the second order is improved, thereby improving the overall efficiency and performance of the intelligent warehousing system.

FIG. 5 is a flowchart of a robot dispatching method according to a fifth embodiment of this application. Based on the above first embodiment or second embodiment, this embodiment provides another example of the robot dispatching method. The warehousing management system can strictly control an order in which a robot enters the workstations and an order of retrieving/depositing goods at the workstations. That is to say, the warehousing management system can fully control a real-time status of all containers, and realize a process of a cross-workstation operation of the autonomous case handling robot.

As shown in FIG. 5, the method specifically includes the following steps:

Step S501: assigning orders to a plurality of workstations.

An implementation of this step is the same as that of step S201, and therefore details are not described herein.

Step S502: determining an idle first robot.

An implementation of this step is the same as that of step S202, and therefore details are not described herein.

Step S503: generating a cross-workstation task for the idle first robot according to order information of the plurality of workstations and real-time status information of all of the containers within a future period of time. The cross-workstation task includes a plurality of to-be-processed orders and an initial container retrieving task, and the plurality of to-be-processed orders correspond to the plurality of workstations.

In this embodiment, the warehousing management system can strictly control the order in which the robot enters the workstations and the order of retrieving/depositing goods at the workstations. That is to say, the warehousing management system can fully control the real-time status of all of the containers.

In this step, the warehousing management system may estimate inventory items and the number of inventory items in containers at each of the workstations where the robot retrieves/places goods within the future period of time based on the order information of the plurality of workstations and the real-time status information of all of the containers within the future period of time. The warehousing management system may generate a cross-workstation task that satisfies order requirements of the workstations to a large extent. The cross-workstation task includes a plurality of to-be-processed orders. The plurality of to-be-processed orders correspond to the plurality of workstations. The cross-workstation task includes an execution order of the to-be-processed orders. According to the execution order, the first robot can satisfy the order requirements of all of the orders in the cross-workstation task through a single transport task.

The initial container retrieving task is used for instructing the first robot to retrieve an initial required container from the shelving unit. The initial required container includes at least the required container of the first order in the cross-workstation task, and may further include other required containers. The initial required container contained in the initial container retrieving task may be determined according to the order requirements of all of the orders in the cross-workstation task and the real-time statuses of all of the containers.

Exemplarily, the warehousing management system may generate the cross-workstation task based on the following principles:

(1) The robot continuously retrieve/deposit containers between the workstations, to reduce times of retrieving/returning containers and accelerate the operation progress of the orders of each of the workstations while satisfying the order requirements of the workstations to a large extent.

(2) The containers/goods can be continuously picked between the workstations, to improve the containers/goods picking utilization.

(3) The robot works continuously between the workstations as much as possible, and does not perform a container returning operation until the containers/goods have been picked.

(4) A single container can be continuously used by each of the workstations, and optimally, goods in the container are picked up to vacate the container.

In this embodiment, the plurality of to-be-processed orders in the cross-workstation task form an order chain according to the execution sequence. The first robot may successively perform the cross-workstation operation on the plurality of to-be-processed orders in the order chain, and place a required container of each order on the corresponding workstation.

In an optional implementation, this step may be implemented in the following way:

Step 1: determining the first order of the first workstation.

Optionally, the first order may be determined according to information such as a generation sequence and a degree of urgency of each order.

After the first order is determined, the required container of the first order is added to the initial container retrieving task.

Step 2: determining inventory items of the containers loaded by the robot after the robot acquires the required container of the first order and places the required container of the first order on the first workstation.

Step 3: determining, according to the inventory items the containers loaded by the robot and the order requirement of each of the workstations, candidate orders having order requirements matching the containers loaded by the robot.

Step 4: determining, according to evaluation parameter information for performing the real-time cross-workstation operation on the candidate orders, candidate orders that satisfy the real-time cross-workstation operation condition, and adding one of the candidate orders that satisfy the real-time cross-workstation operation condition to an end of the order chain as a next order of the first order in the cross-workstation task.

If it is determined according to the evaluation parameter information for performing the real-time cross-workstation operation on the candidate orders that no candidate orders satisfy the real-time cross-workstation operation condition in step 4, the next order is not selected, and orders in the current order chain are used as the cross-workstation task.

If the number of the candidate orders that satisfy the real-time cross-workstation operation condition is 1 in step 4, the candidate order that satisfies the real-time cross-workstation operation condition is used as the next order. If the number of the candidate orders that satisfy the real-time cross-workstation operation condition is greater than 1, one of the candidate orders that satisfy the real-time cross-workstation operation condition is selected as the next order according to the evaluation parameter information for performing the real-time cross-workstation operation on the candidate orders.

Exemplarily, if a plurality of candidate orders satisfy the real-time cross-workstation operation condition, an optimal one of the orders may be selected as the next order according to the evaluation parameter information for performing the real-time cross-workstation operation on the candidate orders. Alternatively, any one of the orders is randomly selected as the next order according to the evaluation parameter information for performing the real-time cross-workstation operation on the candidate orders.

An implementation of "determining, according to the evaluation parameter information for performing the real-time cross-workstation operation on the candidate orders, the candidate orders that satisfy the real-time cross-workstation operation condition" in step 4 is similar to that of "determining, according to the evaluation parameter information for performing the real-time cross-workstation operation on the third orders, the third orders that satisfy the real-time cross-workstation operation condition" in the specific implementation of step S306. A specific implementation of "selecting one of the candidate orders that satisfy the real-time cross-workstation operation condition as the next order" in step 4 is similar to that of "selecting one of the third orders that satisfy the real-time cross-workstation operation condition as the second order" in step S306. For the specific implementation, refer to the relevant description in step S306, and the details are not described in this embodiment.

Step 5: using the order at the end of the order chain as the current order, and determining inventory items of the containers loaded by the robot after the robot places a required container of the current order on the corresponding workstation and retrieves a container of which an operation at the corresponding workstation is completed from the corresponding workstation.

Optionally, after the next order is determined in step 4, an additional container that needs to be retrieved from the shelving unit to satisfy the determined next order may be further determined according to the inventory items of the containers loaded by the robot, and it may be determined whether the number of required containers in the initial container retrieving task exceeds a load threshold of the robot if the additional container is added to the initial container retrieving task. If the number of required containers in the initial container retrieving task does not exceed the load threshold of the robot, the additional container is added to the initial container retrieving task. If the number of required containers in the initial container retrieving task exceeds the load threshold of the robot, the additional container is not added to the initial container retrieving task.

Correspondingly, in step 5, the additional container is added to the containers loaded by the robot, and then the inventory items of the containers loaded by the robot is determined after the robot places the required container of the current order on the corresponding workstation and retrieves a container of which an operation at the corresponding workstation is completed from the corresponding workstation.

After step 5, step 3 to step 4 are performed to determine the next order in the order chain.

The plurality of to-be-processed orders and the initial container retrieving task in the cross-workstation task may be determined through step 1 to step 5.

Step S504: assigning the cross-workstation task to the first robot.

Step S505: dispatching the first robot to retrieve an initial required containers from the shelving unit according to the initial container retrieving task, where the first order is the first one of the plurality of to-be-processed orders.

After the cross-workstation task is assigned to the first robot, the first robot is dispatched to retrieve the initial required containers from the shelving unit according to the initial container retrieving task. The initial required container satisfies the order requirement of the first order of the first workstation.

Step S506: controlling the first robot to move to the first workstation, and control the first robot to place the required container of the first order on the first workstation.

After the first robot retrieves initial required containers, the warehousing management system controls the first robot to move to the first workstation, and controls the first robot to place the required container of the first order to the first workstation.

Step S507: controlling the first robot to retrieve a container of which an operation at the first workstation is completed from the first workstation.

In this embodiment, after the first robot places the required container of the first order of the first workstation on the first workstation, the warehousing management system controls the first robot to retrieve a container of which an operation at the first workstation is completed from the first workstation.

Based on a cross-workstation task generation principle, when the first robot retrieve the container of which the operation at the first workstation is completed from the first workstation, the containers loaded by the first robot certainly satisfy the order demand of the next order.

Step S508: acquiring a next target order according to the cross-workstation task.

If there are still unprocessed orders in the to-be-processed orders in the cross-workstation task, a next to-be-processed order is acquired as the target order.

If all of the to-be-processed orders in the cross-workstation task have been processed, the cross-workstation task is completed, and step S511 is performed to control the first robot to perform a container returning operation.

In this embodiment, each next order of the plurality of to-be-processed orders is successively determined as the target order, and the cross-workstation operation in steps S509-S510 is performed on the target order.

Step S509: dispatching the first robot to move to a target workstation corresponding to the target order, and control the first robot to place a required container of the target order on the target workstation.

Step S510: controlling the first robot to retrieve a container of which an operation at the target workstation is completed from the target workstation.

In this embodiment, after the first robot places the required container of the target order on the target workstation, the warehousing management system controls the first robot to retrieve the container of which an operation at the target workstation is completed from the target workstation, so that the containers loaded by the first robot certainly meet the order requirement of the next order.

After step S510, step S508 is further performed. If there are still unprocessed orders in the to-be-processed orders in the cross-workstation task, the first robot is controlled to perform the cross-workstation operation on a next order.

Step S511: controlling the first robot to perform a container returning operation when the cross-workstation task is completed or when at least one container loaded by the first robot is empty.

In this embodiment of this application, the cross-workstation task is generated for the idle first robot according to the order information of the plurality of workstations and the real-time status information of all of the containers within the future period of time. The cross-workstation task includes the plurality of to-be-processed orders and the initial container retrieving task. The plurality of to-be-processed orders correspond to the plurality of workstations, and the cross-workstation operation is successively performed on the to-be-processed orders in sequence. Therefore, the first robot can complete the plurality of to-be-processed orders through a plurality of cross-workstation operations after a single operation of retrieving containers, which reduces times of retrieving/returning containers, and realizes a more flexible and efficient goods retrieving/placing policy, thereby improving the overall efficiency and performance of an intelligent warehousing system.

Figure 6:
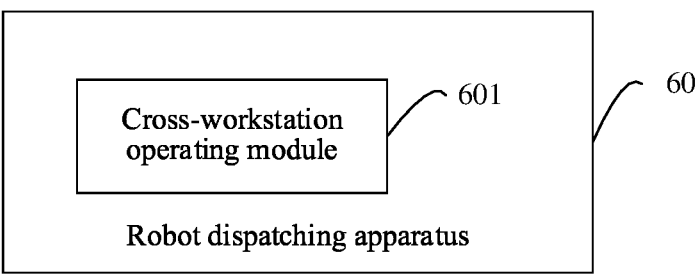
FIG. 6 is a schematic structural diagram of a robot dispatching apparatus according to Embodiment VI of this application.

FIG. 6 is a schematic structural diagram of a robot dispatching apparatus according to a sixth embodiment of this application. The robot dispatching apparatus provided in this embodiment of this application may perform the process provided in the robot dispatching method embodiment. As shown in FIG. 6, the robot dispatching apparatus 60 includes a cross-workstation operating module 601.

Specifically, the cross-workstation operating module 601 is configured to:

control a first robot to move to a second workstation and control the first robot to place a required container of a second order of the second workstation to the second workstation after the first robot places a required container of a first order of a first workstation to the first workstation.

The required container of the second order is a container matching an order requirement of the second order.

The apparatus provided in this embodiment of this application may be specifically configured to implement the method embodiment provided in the first embodiment, and the specific functions are not described in detail herein.

In this embodiment of this application, the first robot is controlled to move to the second workstation and to place the required container of the second order of the second workstation on the second workstation after the first robot places a required container of the first order of the first workstation on the first workstation, so that the first robot can perform a cross-workstation operation of placing containers during a single task of transporting containers. In this way, as many containers as possible can be placed on the workstations in a single task of transporting containers, which reduces times of retrieving/returning containers, and realizes a more flexible and efficient goods retrieving/placing policy, thereby improving the overall efficiency and performance of an intelligent warehousing system.

Figure 7:
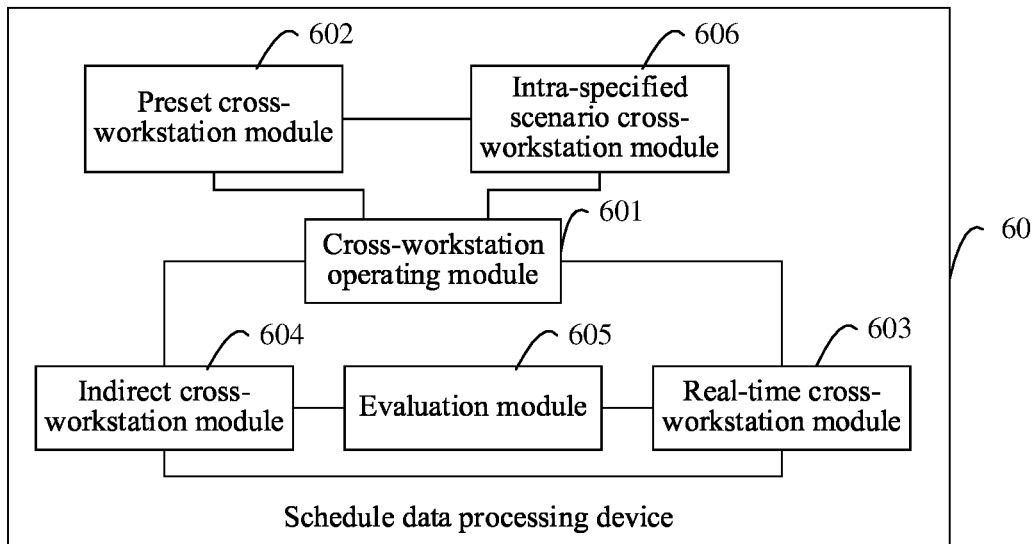
FIG. 7 is a schematic structural diagram of a robot dispatching apparatus according to Embodiment VII of this application.

FIG. 7 is a schematic structural diagram of a robot dispatching apparatus according to a seventh embodiment of this application. Based on the above sixth embodiment, in an optional implementation, the cross-workstation operating module 601 is further configured to control the first robot to retrieve a container, of which an operation at the first workstation is completed, from the first workstation after the first robot places the required container of the first order of the first workstation on the first workstation and before the first robot is controlled to move to the second workstation.

In an optional implementation, as shown in FIG. 7, the robot dispatching apparatus 60 further includes:

a preset cross-workstation module 602 configured to: assign a container retrieving task to the first robot, where the container retrieving task is used for instructing the first robot to retrieve required containers of a plurality of orders from a shelving unit, and the plurality of orders include at least the first order and the second order; and control the first robot to move to the first workstation, and control the first robot to place the required container of the first order to the first workstation.

In this embodiment of this application, the container retrieving task is assigned to the first robot. The container retrieving task is used for instructing the first robot to retrieve the required containers of the plurality of orders from the shelving unit, and the plurality of orders include at least the first order and the second order. The first robot is controlled to move to the first workstation and to place the required container of the first order on the first workstation, and after the first robot places the required container of the first order of the first workstation on the first workstation, the first robot is controlled to move to the second workstation and to place the required container of the second order of the second workstation on the second workstation, so that the first robot can retrieve the required containers of the orders of the plurality of workstations through one operation of retrieving containers, and can perform an operation of depositing containers across workstations. In this way, the first robot can place as many containers as possible on the plurality of workstations in a single task, which reduces times of retrieving/returning containers, and realizes a more flexible and efficient goods retrieving/placing policy, thereby improving the overall efficiency and performance of an intelligent warehousing system.

In an optional implementation, as shown in FIG. 7, the robot dispatching apparatus 60 further includes:

a real-time cross-workstation module 603 configured to: determine third orders of a third workstation according to inventory items in first containers currently loaded by the first robot and an order requirement of each of the workstations after the first robot places the required container of the first order of the first workstation on the first workstation and before the first robot is controlled to move to the second workstation and to place the required container of the second order of the second workstation on the second workstation, where order requirements of the third orders match the inventory items in at least one of the first containers; and use one of the third orders as the second order.

Optionally, the real-time cross-workstation module 603 is further configured to: determine, according to evaluation parameter information for performing a real-time cross-workstation operation on the third orders, third orders that satisfy a real-time cross-workstation operation condition; and use one of the third orders that satisfy the real-time cross-workstation operation condition as the second order.

Optionally, the real-time cross-workstation module 603 is further configured to: use, if the number of the third orders that satisfy the real-time cross-workstation operation condition is 1, the third order that satisfies the real-time cross-workstation operation condition as the second order; and select, if the number of the third orders that satisfy the real-time cross-workstation operation condition is greater than 1, one of the third orders that satisfy the real-time cross-workstation operation condition as the second order according to the evaluation parameter information for performing the real-time cross-workstation operation on the third orders.

Optionally, the real-time cross-workstation module 603 is further configured to: determine a second container according to the order requirement of the second order and the inventory items in the first containers if the first containers currently loaded by the first robot do not satisfy the order requirement of the second order, where the second container and the first container together satisfy the order requirement of the second order; dispatch a second robot to retrieve the second container from the shelving unit; and control the second robot to move to the second workstation, and control the second robot to place the second container on the second workstation.

In this embodiment of this application, after the first robot places the required container of the first order of the first workstation on the first workstation, the third orders are matched for the first robot in real time according to the inventory items in the first containers currently loaded by the first robot, it is evaluated whether the third orders satisfy the real-time cross-workstation operation condition according to the evaluation parameter information for performing the real-time cross-workstation operation for the third orders, and one of the third orders that satisfy the real-time cross-workstation operation conditions is selected as the second order of the second workstation for the first robot to perform the cross-workstation operation. In this way, the order of the next workstation can be matched for the first robot in real time for the cross-workstation operation based on evaluation results of a benefit and a cost of the cross-workstation operation on the orders of each of the workstations, which can further improve the efficiency and performance of the cross-workstation operation for the robot, thereby further improving the overall efficiency and performance of the intelligent warehousing system.

In an optional implementation, as shown in FIG. 7, the robot dispatching apparatus 60 further includes:

an indirect cross-workstation module 604 configured to use one of the third orders as the second order according to the number of first containers matching the order requirements of the third orders if no third order satisfies the real-time cross-workstation operation condition.

Optionally, the indirect cross-workstation module 604 is further configured to: control the first robot to return a first container that does not match the order demand of the second order; control the first robot to retrieve a third container from the shelving unit, where the third container is the required container of the second order, so that the first containers currently loaded by the first robot and the third container satisfy the order requirement of the second order; and control the first robot to move to the second workstation, and control the first robot to place both the first container and the third container that match the second order on the second workstation.

Optionally, the indirect cross-workstation module 604 is further configured to: if no third order satisfies the real-time cross-workstation operation condition, determine the number of first containers that match the order requirements of the third orders, and use third orders in which the number of first containers matching the order requirement is greater than a preset number threshold as fourth orders; determine, according to evaluation parameter information for performing an indirect cross-workstation operation on the fourth orders, fourth orders that satisfy an indirect cross-workstation operation condition; and use one of the fourth orders that satisfy the indirect cross-workstation operation condition as the second order.

In an optional implementation, as shown in FIG. 7, the robot dispatching apparatus 60 further includes:

an estimation module 605 configured to: determine, according to evaluation parameter information for performing a cross-workstation operation on a target order and a threshold condition corresponding to each item of the evaluation parameter information, whether the target order satisfies a corresponding cross-workstation operation condition.

The target order is any of the third orders, the evaluation parameter information for performing the cross-workstation operation on the target order is evaluation parameter information for performing the real-time cross-workstation operation on the target order, and the corresponding cross-workstation operation condition is the real-time cross-workstation operation condition. Alternatively, the target order is any of the fourth orders, the evaluation parameter information for performing the cross-workstation operation on the target order is evaluation parameter information for performing the indirect cross-workstation operation on the target order, and the corresponding cross-workstation operation condition is the indirect cross-workstation operation condition.

Optionally, the estimation module 605 is further configured to determine that the target order satisfies the corresponding cross-workstation operation condition if each item of the evaluation parameter information of the target order satisfies the corresponding threshold condition.

Optionally, the estimation module 605 is further configured to determine that the target order satisfies the corresponding cross-workstation operation condition if at least one item of the evaluation parameter information of the target order satisfies the corresponding threshold condition.

Optionally, the estimation module 605 is further configured to determine that the target order satisfies the corresponding cross-workstation operation condition if at least one particular parameter of the target order satisfies the corresponding threshold condition, where the particular parameter is one or more items pre-specified from the evaluation parameter information.

Optionally, the estimation module 605 is further configured to: determine, according to the evaluation parameter information for performing the cross-workstation operation on the target order, a score value corresponding to each item of the evaluation parameter information of the target order; and determine, according to the score value corresponding to each item of the evaluation parameter information of the target order, whether the target order satisfies the corresponding cross-workstation operation condition.

The target order is any of the third orders, the evaluation parameter information for performing the cross-workstation operation on the target order is evaluation parameter information for performing the real-time cross-workstation operation on the target order, and the corresponding cross-workstation operation condition is the real-time cross-workstation operation condition. Alternatively, the target order is any of the fourth orders, the evaluation parameter information for performing the cross-workstation operation on the target order is evaluation parameter information for performing the indirect cross-workstation operation on the target order, and the corresponding cross-workstation operation condition is the indirect cross-workstation operation condition.

Optionally, the estimation module 605 is further configured to: determine a comprehensive score value of the target order according to the score value corresponding to each item of the evaluation parameter information of the target order; and determine, according to the comprehensive score value of the target order, whether the target order satisfies the corresponding cross-workstation operation condition.

Optionally, the estimation module 605 is further configured to: determine, if the evaluation parameter information of the target order includes benefit parameter information, a benefit score value of the target order according to a score value corresponding to each item of the benefit parameter information of the target order; determine, if the evaluation parameter information of the target order includes cost parameter information, a cost score value of the target order according to a score value corresponding to each item of the cost parameter information of the target order; and determine, according to the benefit score value and/or the cost score value of the target order, whether the target order satisfies the corresponding cross-workstation operation condition.

Optionally, evaluation parameter information for performing the real-time cross-workstation operation on any of target orders includes benefit parameter information and/or cost parameter information.

The benefit parameter information for performing the real-time cross-workstation operation on any of the target orders includes one or more of:

the number of first containers with inventory items matching an order requirement of the target order, a distance between the first workstation and a target workstation corresponding to the target order, an estimated waiting time of the first robot at the target workstation, and a degree of urgency of the target order.

The cost parameter information for performing the real-time cross-workstation operation on any of the target orders includes one or more of:

an idle time of the target workstation for which the target workstation waits before the first robot moves to the target workstation and completes the target order; a time spent by the first robot in moving from the first workstation to the target workstation, and a time spent by the first robot in queuing at the target workstation.

Optionally, evaluation parameter information for performing the indirect cross-workstation operation on any of target orders includes benefit parameter information and/or cost parameter information.

The benefit parameter information for performing the indirect cross-workstation operation on any of the target orders includes one or more of:

the number of first containers with inventory items matching an order requirement of the target order; a distance between a first shelving unit where a first container that does not match the target order is located and the first workstation, a distance between the first shelving unit and a second shelving unit where a fourth container is located, and a distance between the second shelving unit and a target workstation corresponding to the target order, where inventory items in the first container do not satisfy the order requirement of the target order, and the inventory items in the first container and the fourth container satisfy the order requirement of the target order; an estimated waiting time of the first robot at the target workstation; and a degree of urgency of target order.

The cost parameter information for performing the indirect cross-workstation operation on any of the target orders includes one or more of:

an idle time of the target workstation for which the target workstation waits before the first robot moves to the target workstation and completes the target order; a time spent by the first robot in moving from the first shelving unit to the second shelving unit and retrieving the fourth container, a time spent by the first robot in moving from the second shelving unit to the target workstation, and a time spent by the first robot in queuing at the target workstation.

In an optional implementation, the second order is an order currently being executed by the second workstation or an order that is after the order currently being executed order and is not executed.

In this embodiment of this application, after the first robot retrieves the third container, the containers loaded by the first robot satisfy the order requirement of the second order. The warehousing management system controls the first robot to move to the second workstation, and controls the first robot to place the first container and the third container that match the second order on the second workstation, so that all required containers of the second order can be transported to the second workstation through a single transport task of the first robot without a need to dispatch other robots to perform a task of retrieving the third container of the second order. In this way, the utilization of the first robot is improved, and the processing efficiency of second order is improved, thereby improving the overall efficiency and performance of the intelligent warehousing system.

In an optional implementation, as shown in FIG. 7, the robot dispatching apparatus 60 further includes:

an intra-specified scenario cross-workstation module 606 configured to:

generate a cross-workstation task for the first robot that is in an idle state according to the order information of the plurality of workstations and real-time status information of all of the containers within a future period of time, where the cross-workstation task includes a plurality of to-be-processed orders and an initial container retrieving task, and the plurality of to-be-processed orders correspond to the plurality of workstations; and dispatch the first robot to retrieve an initial required container from a shelving unit according to the initial container retrieving task, where the first order is the first one of the plurality of to-be-processed orders.

The intra-specified scenario cross-workstation module 606 is further configured to: after the first robot retrieves the container of which an operation at the first workstation is completed from the first workstation, successively determine each next order of the plurality of to-be-processed orders as a target order according to the cross-workstation task and perform the following cross-workstation operation on the target order: dispatching the first robot to move to a target workstation corresponding to the target order; controlling the first robot to place a required container of the target order on the target workstation; and controlling the first robot to retrieve a container of which an operation at the target workstation is completed from the target workstation.

The intra-specified scenario cross-workstation module 606 is further configured to control the first robot to perform a container returning operation when the cross-workstation task is completed or when at least one container loaded by the first robot is empty.

In this embodiment of this application, the cross-workstation task is generated for the first robot in the idle state according to the order information of the plurality of workstations and the real-time status information of all of the containers within the future period of time. The cross-workstation task includes the plurality of to-be-processed orders and the initial container retrieving task. The plurality of to-be-processed orders correspond to the plurality of workstations, and the cross-workstation operation is successively performed on the to-be-processed orders in sequence. Therefore, the first robot can complete the plurality of to-be-processed orders through a plurality of cross-workstation operations after a single operation of retrieving containers, which reduces times of picking/returning containers, and realizes a more flexible and efficient goods retrieving/placing policy, thereby improving the overall efficiency and performance of an intelligent warehousing system.

The apparatus provided in this embodiment of this application may be specifically configured to implement the process of the method provided in any of the above method embodiments, and the specific functions are not described in detail herein.

Figure 8:
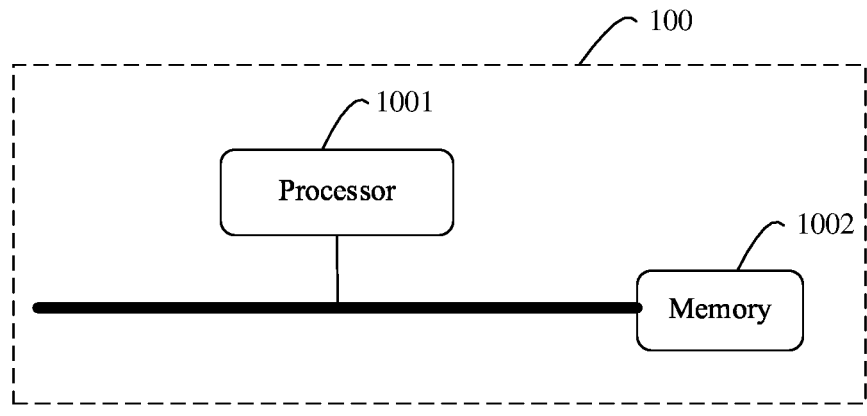
FIG. 8 is a schematic structural diagram of a warehousing management system according to Embodiment VIII of this application.

FIG. 8 is a schematic structural diagram of a warehousing management system according to an eighth embodiment of this application. As shown in FIG. 8, the warehousing management system 100 includes a processor 1001, a memory 1002, and a computer program stored in the memory 1002 and executable in the processor 1001. The processor 1001 implements the robot dispatching method provided in any of the above method embodiments when executing the computer program.

In this embodiment of this application, the first robot is controlled to move to the second workstation and to place the required container of the second order of the second workstation on the second workstation after the first robot places a required container of the first order of the first workstation on the first workstation, so that the first robot can perform an operation of depositing containers across workstations during a single task of transporting containers. In this way, as many containers as possible can be placed on the workstations in a single task of transporting containers, which reduces times of picking/returning containers, and realizes a more flexible and efficient goods retrieving/placing policy, thereby improving the overall efficiency and performance of an intelligent warehousing system.

An embodiment of this application further provides a computer-readable storage medium. The computer-readable storage medium stores a computer program. The computer program is executed by a processor to perform the robot dispatching method provided in any of the above method embodiments.

An embodiment of this application further provides a computer program product. The program product includes a computer program stored in a readable storage medium. At least one processor of a warehousing management system may read the computer program from the readable storage medium. The at least one processor executes the computer program so that the warehousing management system performs the robot dispatching method provided in any of the above method embodiments.

A person skilled in the art may clearly understand that, for convenience and conciseness of the description, only the division of the above functional modules is illustrated. In actual application, the above functions may be assigned to different functional modules for completion as required. In other words, an internal structure of the apparatus is divided into different functional modules to complete all or a part of the functions described above. For a specific working process of the apparatus described above, refer to the corresponding process in the above method embodiment, and the details are not described herein.

A person skilled in the art can easily figure out other implementations of the invention after considering the description and practicing this application that is disclosed herein. This application is intended to cover any variations, usages, or adaptive changes of this application. These variations, usages, or adaptive changes follow the general principles of this application and include common general knowledge or common technical means in the art not disclosed in this application. The description and the embodiments are considered as merely exemplary, and the scope and spirit of this application are indicated by the following claims.

It is to be understood that this application is not limited to the precise structures described above and shown in the drawings, and various modifications and changes may be made without departing from the scope of this application. The scope of this application is limited only by the appended claims.

What is claimed is:

1. A dispatching method performed by a warehousing management system, comprising:

controlling a first robot to move to a first workstation;

controlling the first robot to place a required container of a first order to the first workstation;

after the first robot is controlled to place the required container of the first order to the first workstation, controlling the first robot to move to a second workstation, wherein the second workstation is different from the first workstation; and controlling the first robot to place a required container of a second order to the second workstation;

wherein the method further comprises:

determining that first containers currently loaded by the first robot do not satisfy an order requirement of the second order;

determining a second container according to the order requirement of the second order and items in the first containers, wherein the second container and the first containers satisfy the order requirement of the second order;

dispatching a second robot to retrieve the second container from a shelving unit;

controlling the second robot to move to the second workstation; and controlling the second robot to place the second container to the second workstation.

2. The method according to claim 1, wherein after the step of controlling the first robot to place the required container of the first order to the first workstation and before the step of controlling the first robot to move to the second workstation, the method further comprises:

controlling the first robot to retrieve a container previously placed at the first workstation.

3. The method according to claim 1, wherein before the step of controlling the first robot to move to the first workstation, the method further comprises:

assigning a container retrieving task to the first robot, wherein the container retrieving task is used for instructing the first robot to retrieve required containers of a plurality of orders from a shelving unit, wherein the plurality of orders comprise the first order and the second order, and the retrieved containers comprises the required container of the first order.

4. The method according to claim 1, wherein after the step of controlling the first robot to place the required container of the first order to the first workstation and before the step of controlling the first robot to move to the second workstation, the method further comprises:

determining third orders according to items in the first containers currently loaded by the first robot and an order requirement of each of workstations, wherein order requirements of the third orders match items in at least one of the first containers; and using one of the third orders as the second order.

5. The method according to claim 4, wherein the step of using one of the third orders as the second order comprises:

based at least in part on evaluation parameter information for performing a real-time cross-workstation operation on the third orders, determining third orders that satisfy a real-time cross-workstation operation condition; and using one of the third orders that satisfy the real-time cross-workstation operation condition as the second order.

6. The method according to claim 5, wherein the evaluation parameter information for performing the real-time cross-workstation operation on a target order comprises benefit parameter information, wherein the target order is one of the third orders;

wherein the benefit parameter information comprises one or more of:

the number of the first containers with items matching an order requirement of the target order;

a distance between the first workstation and a target workstation corresponding to the target order;

an estimated waiting time of the first robot at the target workstation; and a degree of urgency of the target order.

7. The method according to claim 5, wherein the evaluation parameter information for performing the real-time cross-workstation operation on a target order comprises cost parameter information, wherein the target order is one of the third orders and corresponds to a target workstation;

wherein the cost parameter information comprises one or more of:

an idle time of the target workstation for which the target workstation waits before the first robot moves to the target workstation and completes the target order; and a time spent by the first robot in moving from the first workstation to the target workstation, and a time spent by the first robot in queuing at the target workstation.

8. The method according to claim 4, wherein the step of using one of the third orders as the second order comprises:

based at least in part on evaluation parameter information for performing a real-time cross-workstation operation on the third orders, determining that none of third orders satisfies a real-time cross-workstation operation condition; and based on the number of the first containers matching the order requirements of the third orders, using one of the third orders as the second order.

9. The method according to claim 8, wherein the step of using one of the third orders as the second order comprises:

determining the number of the first containers matching the order requirements of the third orders and using third orders in which the number of the first containers matching the order requirements is greater than a preset number threshold as fourth orders;

based at least in part on evaluation parameter information for performing an indirect cross-workstation operation on the fourth orders, determining fourth orders that satisfy an indirect cross-workstation operation condition; and using one of the fourth orders that satisfy the indirect cross-workstation operation condition as the second order.

10. The method according to claim 9, wherein the evaluation parameter information for performing the indirect cross-workstation operation on a target order comprises benefit parameter information and cost parameter information, wherein the target order is one of the fourth orders;

wherein the benefit parameter information comprises one or more of:

the number of the first containers with items matching an order requirement of the target order;

a distance between a first shelving unit where a first container that does not match the target order is located and the first workstation;

a distance between the first shelving unit and a second shelving unit where a fourth container is located;

a distance between the second shelving unit and a target workstation corresponding to the target order, wherein items in the first container do not satisfy the order requirement of the target order, and items in the fourth container and the first container satisfy the order requirement of the target order;

an estimated waiting time of the first robot at the target workstation; and a degree of urgency of the target order;

wherein the cost parameter information comprises one or more of:

an idle time of the target workstation for which the target workstation waits before the first robot moves to the target workstation and completes the target order;

a time spent by the first robot in moving from the first shelving unit to the second shelving unit and retrieving a fourth container;

a time spent by the first robot in moving from the second shelving unit to the target workstation; and a time spent by the first robot in queuing at the target workstation.

11. The method according to claim 4, further comprising:

based at least in part on evaluation parameter information for performing a cross-workstation operation on a target order and a threshold condition corresponding to each item of the evaluation parameter information, determining whether the target order satisfies a cross-workstation operation condition, wherein the target order is one of the third orders.

12. The method according to claim 11, wherein the step of determining whether the target order satisfies the cross-workstation operation condition comprises:

determining that at least one item of the evaluation parameter information of the target order satisfies a corresponding threshold condition;

based on a determination that at least one item of the evaluation parameter information of the target order satisfies the corresponding threshold condition, determining that the target order satisfies the cross-workstation operation condition.

13. The method according to claim 11, wherein the step of determining whether the target order satisfies the cross-workstation operation condition comprises:

based at least in part on the evaluation parameter information for performing the cross-workstation operation on the target order, determining a score value corresponding to each item of the evaluation parameter information of the target order; and based at least in part on the score value corresponding to each item of the evaluation parameter information of the target order, determining whether the target order satisfies the cross-workstation operation condition.

14. The method according to claim 13, wherein the step of determining whether the target order satisfies the cross-workstation operation condition comprises:

based at least in part on the score value corresponding to each item of the evaluation parameter information of the target order, determining a comprehensive score value of the target order; and based at least in part on the comprehensive score value of the target order, determining whether the target order satisfies the cross-workstation operation condition.

15. The method according to claim 13, wherein the evaluation parameter information of the target order comprises benefit parameter information;

wherein the step of determining whether the target order satisfies the cross-workstation operation condition comprises:

determining a benefit score value of the target order based at least in part on a score value corresponding to each item of the benefit parameter information of the target order; and based at least in part on the benefit score value of the target order, determining whether the target order satisfies the cross-workstation operation condition.

16. The method according to claim 13, wherein the evaluation parameter information of the target order comprises cost parameter information;

wherein the step of determining whether the target order satisfies the cross-workstation operation condition comprises:

determining a cost score value of the target order based at least in part on a score value corresponding to each item of the cost parameter information of the target order; and based at least in part on the cost score value of the target order, determining whether the target order satisfies the cross-workstation operation condition.

17. The method according to claim 1, wherein before the step of controlling the first robot to move to the first workstation, the method further comprises:

generating a cross-workstation task for the first robot that is in an idle state according to order information of a plurality of workstations and real-time status information of all of containers within a future period of time, wherein the cross-workstation task comprises a plurality of to-be-processed orders and an initial container retrieving task, wherein the plurality of to-be-processed orders correspond to the plurality of workstations; and dispatching the first robot to retrieve an initial required container from a shelving unit according to the initial container retrieving task, wherein the first order is the first one of the plurality of to-be-processed orders.

18. A dispatching apparatus, comprising a processor, and a memory having computer program codes;

wherein the processor is configured to perform the steps in method of claim 1 when the computer program codes are executed by the processor.

\* \* \* \* \*